Feb. 13, 1968 D. H. CALLIHAN 3,369,092
THERMAL STACK SWITCH WITH A PAIR OF ADJUSTMEMT MEANS
Filed Jan. 12, 1966
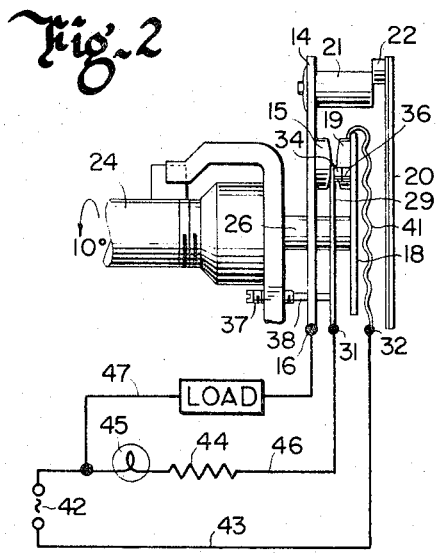
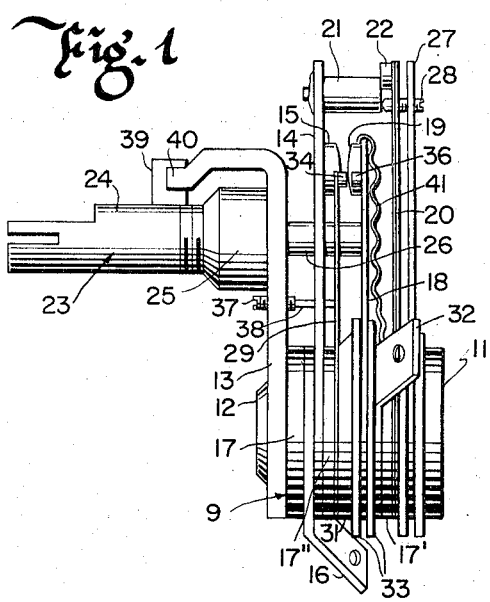
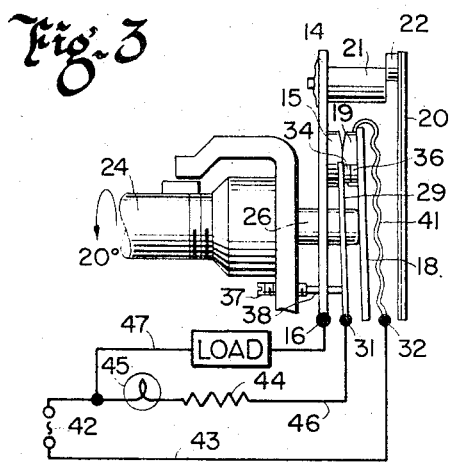
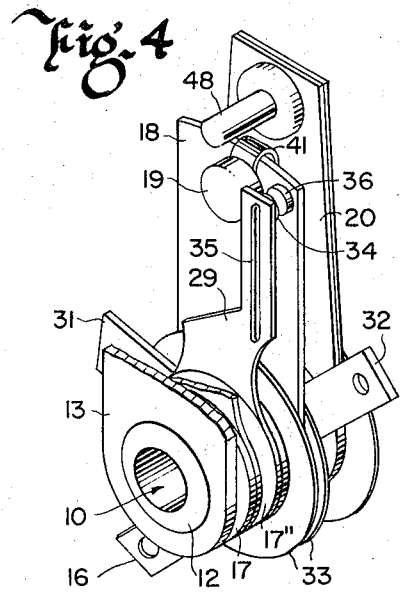
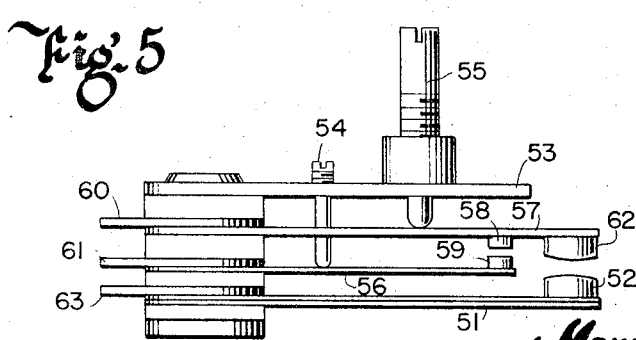
INVENTOR.
DALE H. CALLIHAN
BY
*Marshall, Wilson & Yeasting*
— Attorneys —

United States Patent Office 3,369,092
Patented Feb. 13, 1968

3,369,092
THERMAL STACK SWITCH WITH A PAIR OF ADJUSTMENT MEANS
Dale H. Callihan, Huron, Ohio, assignor to Norwalk Thermostat Company, Norwalk, Ohio, a corporation of Ohio
Filed Jan. 12, 1966, Ser. No. 520,168
12 Claims. (Cl. 200—122)

ABSTRACT OF THE DISCLOSURE

A thermostatic switch which can be manually set for a manual switch which is closed at a preselected setting of the control for the thermostatic switch. The manual control means common to the thermostat and switch displaces a control blade having contacting regions for the thermostat and switch on the same face. The setting for the manual switch is adjustable to enable that switch to be closed at any of a range of positions of the manual control means encompassing the thermostat operating temperature whereby a thermostatically controlled circuit can be completed either before, after or simultaneously with the closure of the manually controlled switch circuit.

---

This invention relates to an adjustable dual controlled thermostat including adjusting means providing circuit control over a range of operating temperatures and circuit control independent of operating temperatures.

An object of this invention is to improve thermostats both from the standpoints of the operating functions provided and the reliability of operation.

Another object is to simplify and reduce the size of the structure required for a dual control thermostat.

Another object is to close and open a first switch at a predetermined temperature setting for a thermostatically controlled switch.

Another object is to insure the closing of a first circuit controlled by a dual control thermostat prior to closing a second circuit as in the illustrated embodiment to close an indicator circuit prior to any operation of a thermally controlled main circuit.

Another object is to maintain a first circuit closed throughout all ranges of operation of a second circuit.

Another object is to provide the aforenoted functions with an assembly of elements which in the main are standard for conventional thermostat construction.

One feature of this invention involves a thermostat structure having a primary control blade which has contacts common to two circuits and is arranged to be manually adjusted to a range of positions including a first position in which both circuits are opened, a second position adjacent said first position in the adjusting sequence wherein a first circuit is closed between one contact on said blade and a second contact on a second adjustably positioned blade. The third range of adjustments for the primary control blade is capable of establishing different temperatures of operation through electrical engagement with a third contact arm whose position is determined by a thermally sensitive means. An arrangement of this nature wherein the second range of adjustment is intermediate the first and third ranges of adjustment of the common circuit contact arm insures that one circuit controlled by the adjusting means is closed prior to the thermally responsive circuit and is maintained through all ranges of adjustment wherein the thermally responsive circuit is active. This type of control is particularly desirable for heating units for example, in the case of a hot plate wherein it is desirable to indicate at all times when the control has been moved from its off position, and wherein an indicator circuit is responsive to the first circuit and the heating load is controlled by the second thermally responsive circuit.

The above and additional objects and features of this invention will be more fully appreciated from the following detailed description when read with reference to the accompanying drawing in which:

FIG. 1 is a side elevation of one embodiment of this invention showing all contacts open in the dual thermostat adjusted to its off condition:

FIG. 2 is a schematic diagram of a circuit and a diagrammatic side view of the device in FIG. 1 adjusted to its second position wherein a first circuit is closed and a second circuit is not yet operative;

FIG. 3 is a diagrammatic illustration as in FIG. 2 wherein the adjustment means is in its third range wherein both circuits are closed;

FIG. 4 is a partially broken away perspective of a second embodiment of the device of FIG. 1 wherein the open circuit position is established by the positioning of a thermally responsive element; and FIG. 5 is a side elevation of a third embodiment of the invention.

The structure of FIG. 1 is of generally conventional form, comprising a stack 9 of elements assembled on a column which may be in the form of a rivet 10 having a head 11, a shank passing through suitable apertures in each of the elements in the stack and an upset end 12 on the stack to secure it. A first rigid supporting arm 13 extends from the stack to support adjusting means to be discussed, and to afford a mounting means for the structure. The thermostat comprises a thermally actuated flexible blade 14 formed away from the support 13 so that it is resiliently biased away from the support and having a contact 15 near its end remote from the stack 9. Blade 14 is electrically engaged with terminal 16 and both the blade and terminal are insulated from the stack by an insulating bushing 17 of conventional form having a shank (not shown) embracing the shank of rivet 10 and extending through apertures in terminal 16 and blade 14. A second flexible blade 18 having a contact 19 at its outer end in registry with contact 15 is insulatingly mounted in the stack 9 whereby contacts 15 and 19 are the engaging elements of a thermostatic switch. Blade 18 has a form toward the support 13 in the region adjacent the stack to resiliently bias its outer end toward the support.

A thermally responsive actuator in the form of a bimetal blade 20 insulatingly mounted in stack 9 by a bushing 17' corresponding to bushing 17 controls the position of blade 14 throughout the operating temperature range. Blade 20 is arranged to deflect toward support 13 with increased temperature. This control is afforded through the insulating pin 21 mounted on blade 14 and extending to a protrusion 22 formed out of the blade 20 to provide a bearing surface.

The position of contact 19 and thus the temperature at which contact 19 engages contact 15 is controlled by the adjusting means 23. Adjusting means 23 is made up of a shaft 24 threadedly mounted in a bushing 25 secured to support 13. Shaft 24 is rotatable about 340° of rotation to extend and retract the insulating pin 26 which it supports axially thereof in contact with blade 18. Pin 26 passes through a suitable aperture in blade 14 with suitable clearance to avoid interference with that blade. The mechanical bias of blade 14 tends to maintain pin 21 in engagement with protrusion 22 throughout the operating temperature range of the thermostat.

Below the operating temperature range a positive stop for the pin 21 is provided by rigid support arm 27 and the screw threaded pin 28 threadedly engaged therewith and extending through a suitable clearance aperture in the bimetallic blade 20 to engage the end of insulating pin 21. Thus, below the lower limit of the operating temperature range the motion of bimetallic blade 20 away from support 13 has no effect on the motion of blade 14 and contact 15 and a "positive off" position is established wherein the positioning of blade 18 and contact 19 can be established with assurance that no circuit can be made up by engagement of contacts 15 and 19. The temperature limit for this "positive off" position is determined by the screw adjustment of the threaded pin 28.

The "off" position of the thermostat is correlated with the position of shaft 24 so that pin 26 carries blade 18 and contact 19 to a position in which contact 19 is spaced from contact 15 at the time blade 14 is stopped with pin 21 abutting pin 28.

In the structure of FIG. 1 it is desirable to insure the closure of a first circuit prior to closing the thermostat contacts. This first circuit is made from blade 18 to blade 29. Blade 29 is electrically connected to terminal 31 both of which are insulated from the stack 9 by a bushing 17″ corresponding to bushing 17. Blade 18 is insulated from terminal 31 and terminal 32 by insulating washers 33 which can be of mica. Blade 29 is provided with a contact 34 adjacent its end outermost from the stack. It is formed toward support 13 in the region adjacent the stack to bias its outer end resiliently toward the support 13. The blade is shaped as best seen in FIG. 4 such that its longitudinal axis extends radially from the axis of the shank of rivet 10 and is in the same plane as the longitudinal axes of blades 14 and 18. It is offset from the longitudinal axis in its major plane as at 35 to a length of reduced width so that it provides clearance for adjusting pin 26 and is out of registry with contacts 15 and 19 while maintaining contact 34 at a distance from stack 9 at least as great as the separation of contact 19 from the stack. Portion 35 is of sufficient flexibility to yield as the position of blade 18 is adjusted without appreciable effect on the position of that blade and is stiff enough to insure effective electrical engagement of contact 34 with blade 18.

Contact 34 engages blade 18, or as illustrated a contact 36 on blade 18, adjacent contact 19 so that the displacement of contact 19 of the thermostat and the effective portion of the blade 18 in the switch circuit are similar. The position of contact 34 is controlled by adjusting screw 37 which threadedly engages suppport 13 and carries an insulating pin through a suitable aperture in blade 14 and 38 into engagement with blade 29 intermediate the stack 9 and the narrowed region 35.

In adjusting the structure of FIG. 1 pin 28 is adjusted to engage the actuator pin 21 and maintain it free of the protuberance 22 for temperatures below the operating range of the thermostat. This establishes the limit of travel of blade 14 away from support 13. Shaft 24 is then rotated to force blade 18 away from support 13 such that the shaft is rotated some given amount, for example 20 angular degrees of rotation, after the contact 19 is separated from the contact 15 while blade 14 is in its "positive off" position. A stop 39 is then formed on shaft 24 as by welding a stud in position to abut the upstanding ear 40 at the end of support 13. This establishes the "off" position for the structure. The shaft 24 is then rotated some given amount less than the amount to engage contacts 15 and 19 at the maximum excursion of blade 14 in the "off" direction, for example 10 angular degrees of rotation from the "off" position. In this position, screw 37 is adjusted to displace blade 29 from support 13 and engage contact 34 with blade 18 or contact 36.

With the above adjustments, the switch contacts and thermostat contacts are open in the "off" setting of shaft 24 as shown in FIG. 1. A rotation of shaft 24 to displace stop 39 ten angular degrees from its abutting position with ear 40 closes the switch contacts 34 and 36 in the example, while the thermostat remains open at contacts 15 and 19 as shown in FIG. 2. Further rotation of shaft 24 to a position at least twenty angular degrees from its "off" position as shown in FIG. 3 closes contacts 15 and 19 provided the bimetallic blade has not been heated to the temperature of that setting. Thus, rotational adjustment of shaft 24 and adjustment of actuator pin 26 beyond the point at which initial cold contact is established between contacts 15 and 19 can be calibrated to temperature setting as sensed by bimetal 20, since for any given temperature setting the bimetal excursion toward support 13 when that temperature is achieved or exceeded will open the contacts. Below that temperature the contacts remain closed.

In the embodiments of FIGS. 1 through 4 the temperature of the bimetal is established by means of a heater ribbon 41 extending from the stack 9 at terminal 32 to the end of blade 18 and adjacent bimetal 20. The heater circuit is electrically isolated from the elements of the stack other than terminal 32 by the insulating washer 33 and bushing 17′ adjacent terminal 32. It extends as shown in FIGS. 2 and 3 from a suitable source 42 over lead 43 to terminal 32, ribbon 41, blade 18 and alternatively through the thermostat contacts 19 and 15 or the switch contacts 36 and 34. In the portion of the heater circuit including the switch, a limiting resistance 44 is employed in series with an indicator lamp 45. The portion of the circuit is from contact 34 through blade 29, terminal 31, lead 46, resistance 44 and lamp 45 to the source 42. In one embodiment the indicator circuit draws of the order 2 milliamperes by employing a limiting resistance 44 of from forty thousand to one hundred twenty thousand ohms and thus has a negligible heating effect in heater ribbon 41.

The thermally actuated circuit from contact 15 carries the preponderant and effective heater current through blade 14 to terminal 16, lead 47, the load to be controlled and source 42. A typical load is a heater element of 1250 watts drawing 10 amperes. Thus the current in the heater 41 is proportional to that in the load both in amount and duration of flow, so that the heat to the bimetal is similarly proportioned and the excursions of blade 20 to open and close contacts 15 and 19 cycle around the temperature setting established by the rotational position of shaft 24.

The embodiment of FIG. 4 is composed of elements corresponding to those of FIGS. 1, 2 and 3 with the exception that the "positive off" afforded by rigid support 27 and screw adjusted stop 28 has been omitted. In this embodiment the actuating element operatively engaging the bimetal 20 with the thermally actuated blade 14 (shown fragmentarily in FIG. 4) comprises an insulating pin 48 secured to the bimetal 20. The "off" position is established as that assumed by the bimetal and its following blade 14 at ambient temperatures. Shaft 24 and pin 38 are adjusted to permit closure of contacts 36 and 34 prior to any closure of contacts 15 and 19 at the lowest ambient temperature to be anticipated for the device. In other respects the adjustment and operation of the structure of FIG. 4 corresponds to that of FIGS. 1, 2 and 3.

FIG. 5 illustrates another form of unitary thermostat and switch arranged and adjusted to close from a single control a manually controlled switch prior to closing a manually adjusted thermostatically controlled switch. In this embodiment the resilient blade 14 which was indirectly thermally actuated by bimetal 20 is supplanted by a contact carrying bimetal blade 51. No heater ribbon is employed so that the temperature of the bimetal and the resultant displacement of its contact 52 is controlled by a combination of the current flowing in the bimetal and the heat adjacent the bimetal. Accordingly, a unit as shown in FIG. 5 is mounted in intimate heat transfer relationship with its load so that the temperature of the load directly contributes to the temperature of the bimetal and its control function. As in the other embodiments, the unit of FIG. 5 has a common support 53 for a pair of adjusting means 54 and 55 and a pair of resilient contact carrying blades 56 and 57 formed to have a bias toward the support 53. The adjusting means 54 and 55 operatively engage their respective blades 56 and 57 throughout the range of operation of the unit and are adjusted so that manual adjustment of means 55 from its "off" position toward its "on" position displaces blade 57 initially to close a contact 58 on blade 57 upon contact 59 on blade 56. This completes a circuit between terminal 60 of blade 57 and terminal 61 of blade 56. Further rotation of the shaft of adjusting means 55 toward its "on" position carries blade 57 and its contact 62 into engagement with contact 52. The load circuit is thereby completed between terminal 60 and terminal 63 of bimetal blade 51.

The structure of FIG. 5 is assembled as a stack in the manner described. Contact supporting blades and their respective electrical terminals are isolated from each other and support 53 as by insulating bushings corresponding to bushing 17 of FIG. 1. The adjusting means 54 is made effective upon blade 56 without interfering with blade 57 by providing an aperture in 57 having suitable clearance.

As the load current in bimetal 51 and in the load develops heat the bimetal distorts tending to move contact 52 away from contact 62 to open these contacts. As the bimetal cools it distorts to move contact 52 toward contact 62. The contacts are thereby opened and closed cyclically around a temperature for which adjusting means 55 is set. Thus a first circuit is completed prior to setting the thermostatically controlled circuit for operation and is maintained through all settings for operating the thermostatically controlled circuit.

While the embodiments disclosed in detail have been described as adjusted in a manner to close the adjustment means actuated switch prior to adjustment into the range in which the thermostatically controlled switch is effective, the utility of these devices is not restricted to this operating mode. For example, in FIGS. 1 to 3, the second adjustment, screw 37, can be set to permit closure of contacts 34 and 36 at any setting of the primary adjusting means 23. Thus, screw 37, might be set to position contact 34 so that contact 36 would close with it when the thermostat was set by the positioning of pin 26 at the half heat setting. Adjusting means 37 thereby provides a setting for the closing of the circuit between terminals 31 and 32 at and beyond any chosen point in the range of adjusting means 23 and independent of the operation of the thermostat contacts 15 and 19.

It is to be understood that the preceding disclosure is exemplary of the invention and that variations thereof can be made without departing from its spirit or scope. Accordingly, this disclosure is not to be read in a limiting sense.

Having described the invention, I claim:

1. A unitary switch and thermostat comprising a thermally actuated blade having a first contact, a second blade having on one face a second contact for cooperation with said first contact to form a thermostat, a third blade having a third contact for cooperation with said one face of said second blade to form a switch, first adjusting means for adjusting said second blade toward and away from said first and third contacts, and second adjusting means for adjusting said third blade and said third contact toward and away from said second blade whereby said third blade is adjustable over a range of positions relative to said second blade which enables said third contact initially to be engaged electrically with said second blade in response to the movement of said second blade by said first adjusting means at a position located over a range of positions of said second blade which encompasses the position of initial engagement of said first and second contacts as established by the position of said thermally actuated blade.

2. A combination according to claim 1 including a stack in which said blades are mounted in insulated relation to each other with said third blade between said thermally actuated blade and said second blade.

3. A combination according to claim 2 wherein said second adjusting means is operatively engaged with said third blade throughout all operating conditions and said first adjusting means is operatively engaged with said second blade through the range of operating temperatures for said thermostat.

4. A combination according to claim 2 including a rigid support extending from said stack and supporting said first and second adjusting means.

5. A combination according to claim 1 wherein said second adjusting means is adjusted to position said third contact to electrically engage said second blade in response to adjustment of said second blade by said first adjusting means prior to engagement between said first and second contacts at any operating temperature to which said thermostat is normally subjected.

6. A combination according to claim 2 wherein said third blade extends from said stack a distance at least as great as the separation of said second contact from said stack.

7. A combination according to claim 2 wherein said third blade has a longitudinal axis parallel to the longitudinal axis of said second blade and said third blade has a portion offset from said longitudinal axis and in the general plane of said blade in its region adjacent said third contact to position said third contact and all portions of said third blade out of registry with said first and second contacts at a distance from said stack at least as great as the separation of said second contact from said stack.

8. A combination according to claim 2 including a bimetallic blade located adjacent said second blade and being spaced thereby from said third blade, an actuator for transmitting motion of said bimetallic blade to said thermally actuated blade, said thermally actuated blade being resiliently biased toward said bimetallic blade, said second and third blades being resiliently biased away from said bimetallic blade and said bimetallic blade being arranged to deflect toward said thermally actuated blade with increases in temperature.

9. A combination according to claim 8 including a rigid support extending from said stack adjacent said bimetallic blade and spaced thereby from said second blade, said actuator being secured to said thermally actuated blade, and a stock for said actuator attached to said rigid support and arranged to clear said bimetallic blade while engaging said actuator whereby the travel of said thermally actuated blade is limited.

10. A combination according to claim 2 including a rigid support extending from said stack adjacent said thermally actuated blade, said first adjusting means extending from said support to engage said second blade and arranged to clear said third and thermally actuated blades, said second adjusting means extending from said support to engage said third blade and arranged to clear said thermally actuated blade, said second and third blades each being biased toward said rigid support, and said thermally actuated blade being arranged to move toward said support in response to increases in actuating temperature.

11. A combination according to claim 2 including a rigid support extending from said stack adjacent said second blade, said first adjusting means extending from said support to engage said second blade, said second adjusting means extending from said support to engage said third blade and arranged to clear said second blade, said second and third blades each being biased toward said rigid support, and said thermally actuated blade being arranged to move away from said support in response to increases in actuating temperature.

12. A combination according to claim 1 wherein said first adjusting means is adapted for manual adjustment of said second blade throughout the useful life of said unitary switch and thermostat and said second adjusting means is adapted for presetting the position of said third blade during manufacture of said unitary switch and thermostat.

References Cited

UNITED STATES PATENTS

| | | | |
|---|---|---|---|
| 2,847,553 | 8/1950 | Smith | 200—138 |
| 2,753,437 | 7/1956 | Mertler | 200—138 X |
| 3,114,812 | 12/1963 | Levinn | 200—138 X |
| 2,527,775 | 10/1950 | Sutton. | |

BERNARD A. GILHEANY, *Primary Examiner.*

H. A. LEWITTER, *Assistant Examiner.*